Figure 4:
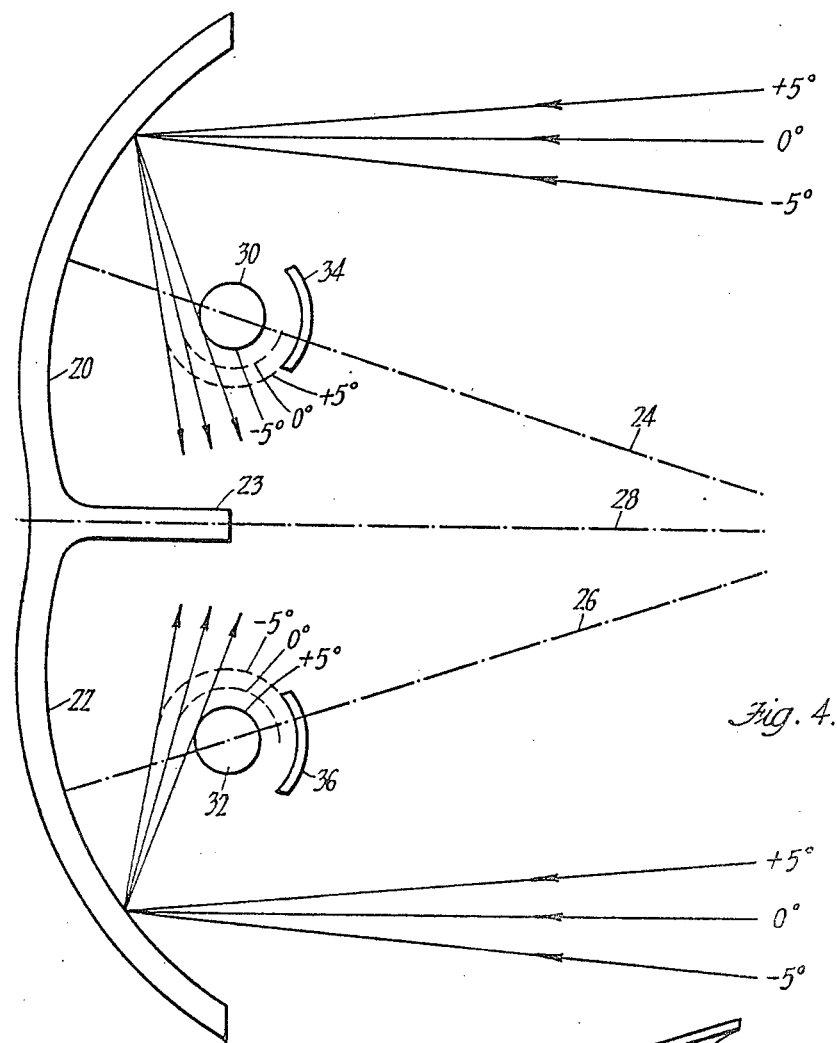

United States Patent [19]

Trihey

[11] 4,324,225
[45] Apr. 13, 1982

[54] SOLAR TRACKING DEVICE

[76] Inventor: John M. Trihey, 241 Bayswater Rd., Bayswater, Victoria, Australia

[21] Appl. No.: 883,313

[22] Filed: Mar. 3, 1978

Related U.S. Application Data

[63] Continuation-in-part of Ser. No. 704,674, Jul. 12, 1976, Pat. No. 4,089,323.

[30] Foreign Application Priority Data

Jul. 11, 1975 [AU] Australia ............................. PC2334
Apr. 21, 1977 [AU] Australia ............................. PC9839

[51] Int. Cl.$^3$ .............................................. F24J 3/02
[52] U.S. Cl. ................................. 126/425; 126/424; 126/438; 126/439
[58] Field of Search ............... 126/425, 438, 439, 424, 126/417; 353/3

[56] References Cited

U.S. PATENT DOCUMENTS

| | | | |
|---|---|---|---|
| 1,951,404 | 3/1934 | Goddard | 126/425 |
| 3,976,508 | 8/1976 | Mlausky | 126/443 X |
| 3,982,526 | 9/1976 | Barak | 126/425 |
| 3,988,166 | 10/1976 | Beam | 126/424 X |
| 3,996,917 | 12/1976 | Trihey | 126/424 X |
| 4,027,651 | 6/1977 | Robbins, Jr. | 126/425 |
| 4,044,752 | 8/1977 | Barak | 126/425 |
| 4,089,323 | 5/1978 | Trihey | 126/271 |

Primary Examiner—Larry Jones
Attorney, Agent, or Firm—Cushman, Darby & Cushman

[57] ABSTRACT

Solar energy conversion apparatus comprises a solar energy utilization surface, a reflective solar energy concentrator, a tracking device operable to cause the concentrator to track the sun and thereby concentrate solar energy on the utilization surface, a structure defining a shaded zone between the concentrator and the utilization surface such that solar rays reflected from the concentrator toward the utilization surface do not enter the shaded zone when the concentrator is aligned with the sun, wherein the tracking device includes solar energy sensitive elements located within the shaded zone and producing tracking control signals when struck by solar rays when the concentrator is not aligned with the sun.

70 Claims, 30 Drawing Figures

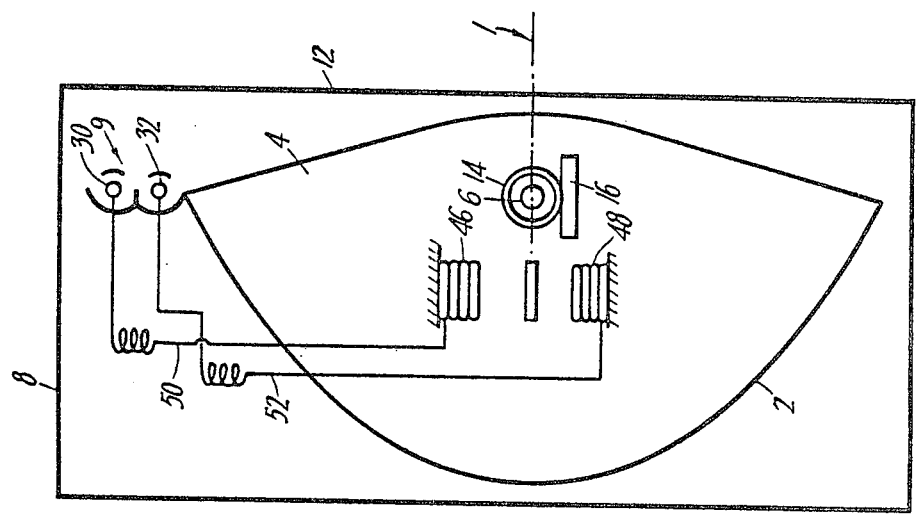
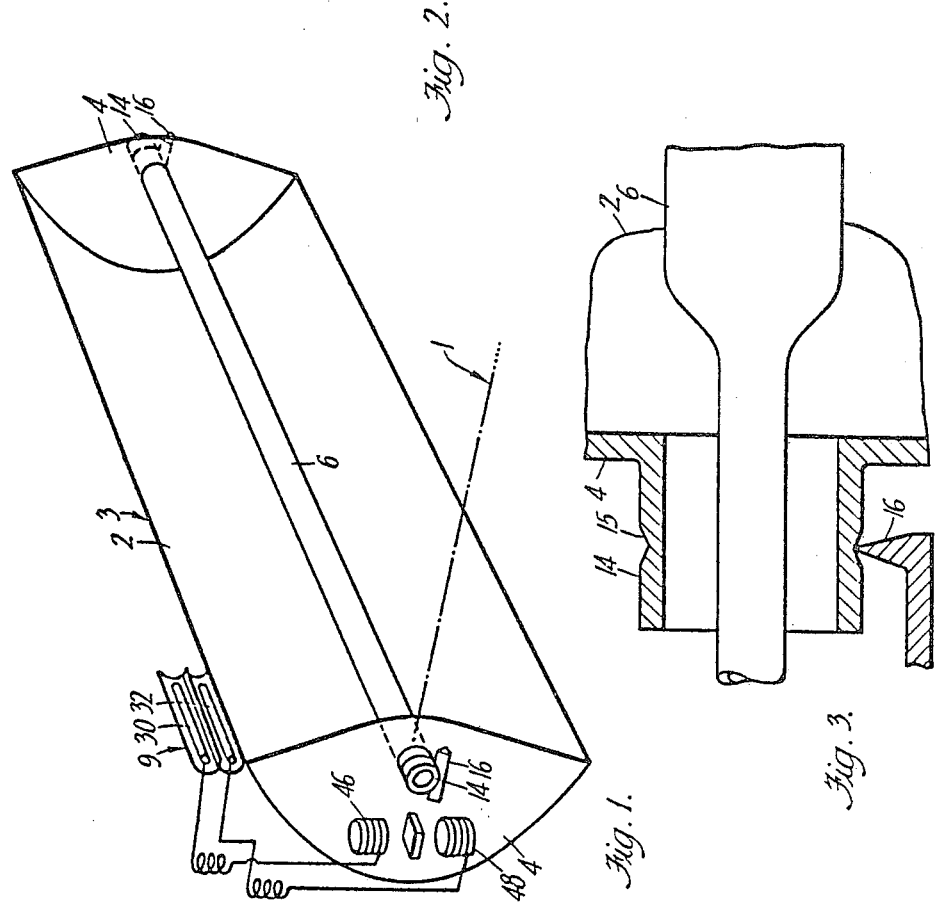
Fig. 2.
Fig. 1.
Fig. 3.

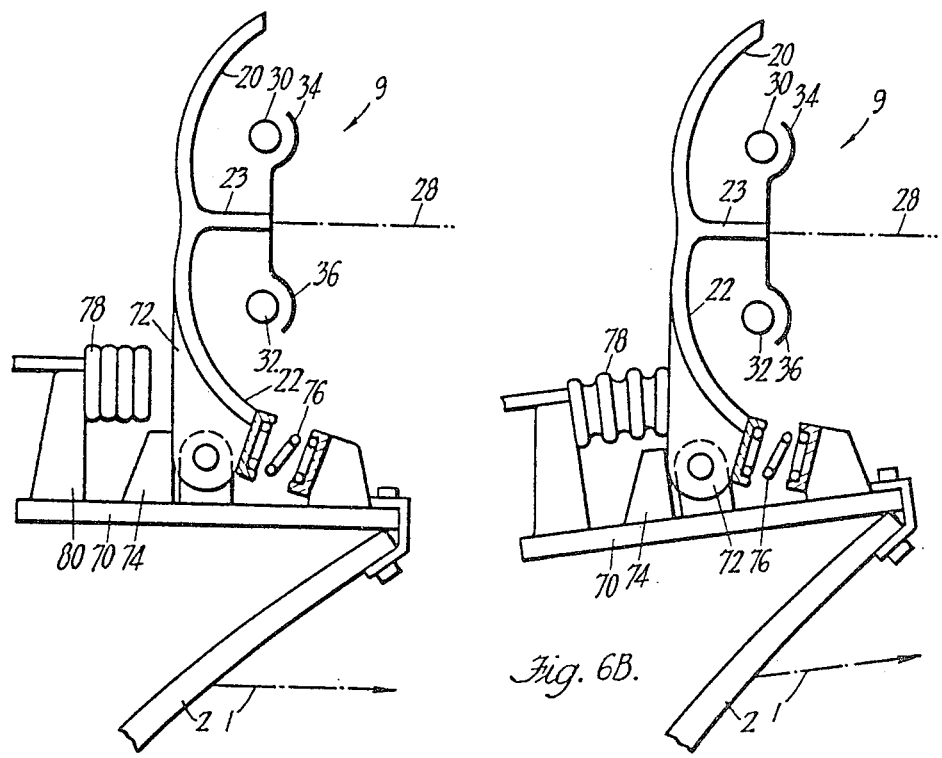
Fig. 6A.  Fig. 6B.
Fig. 7.
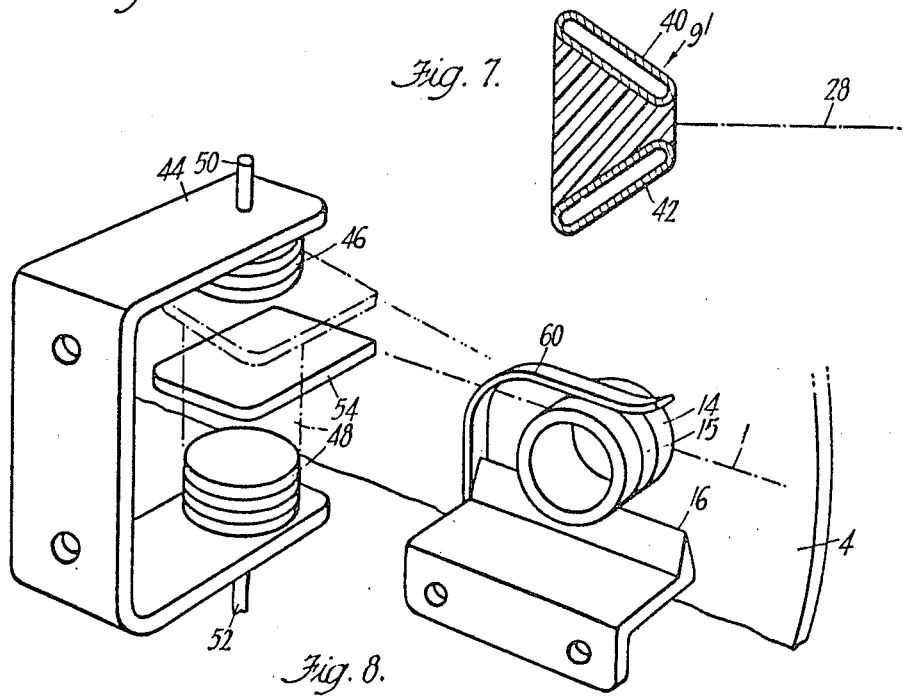
Fig. 8.

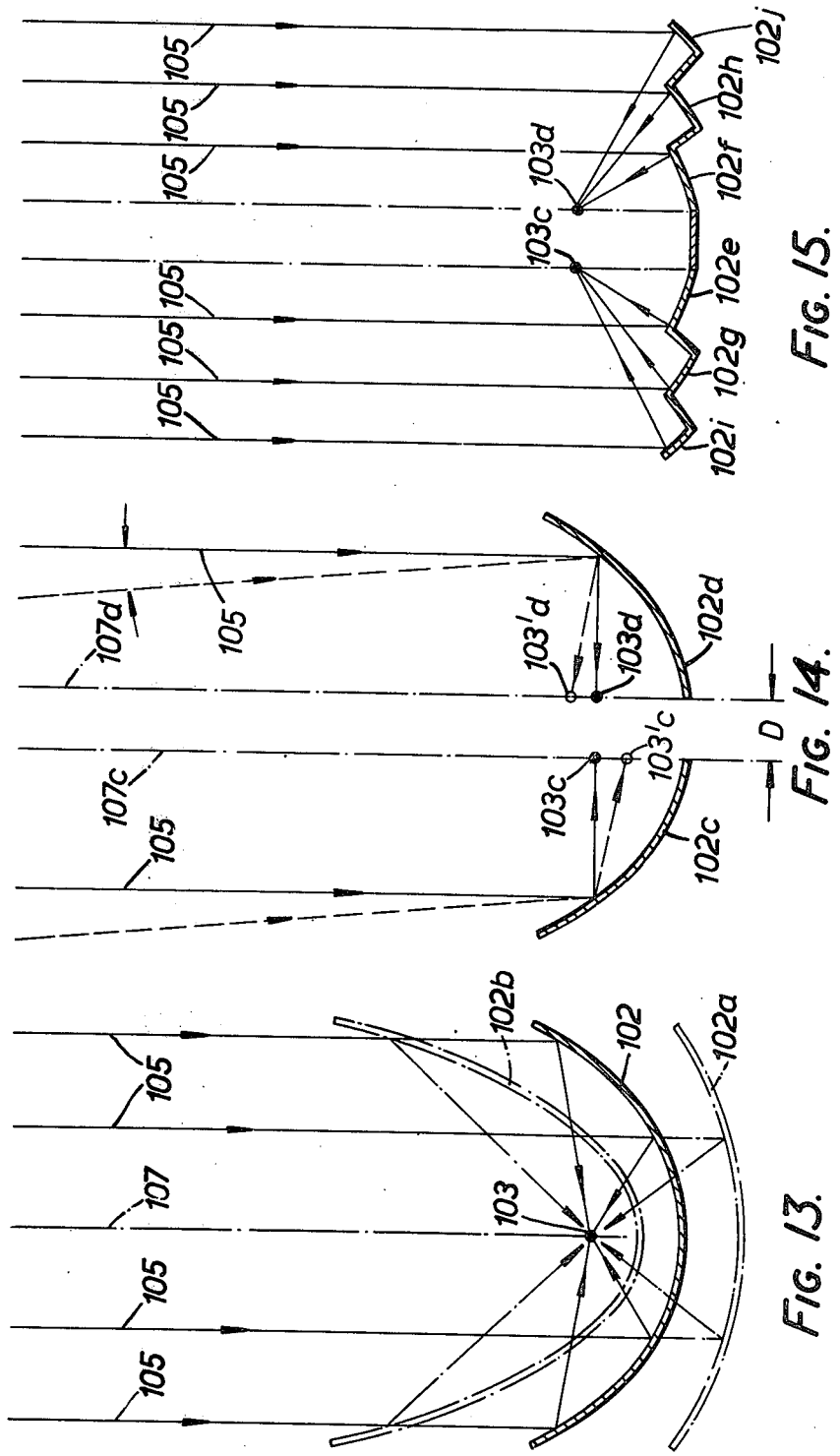

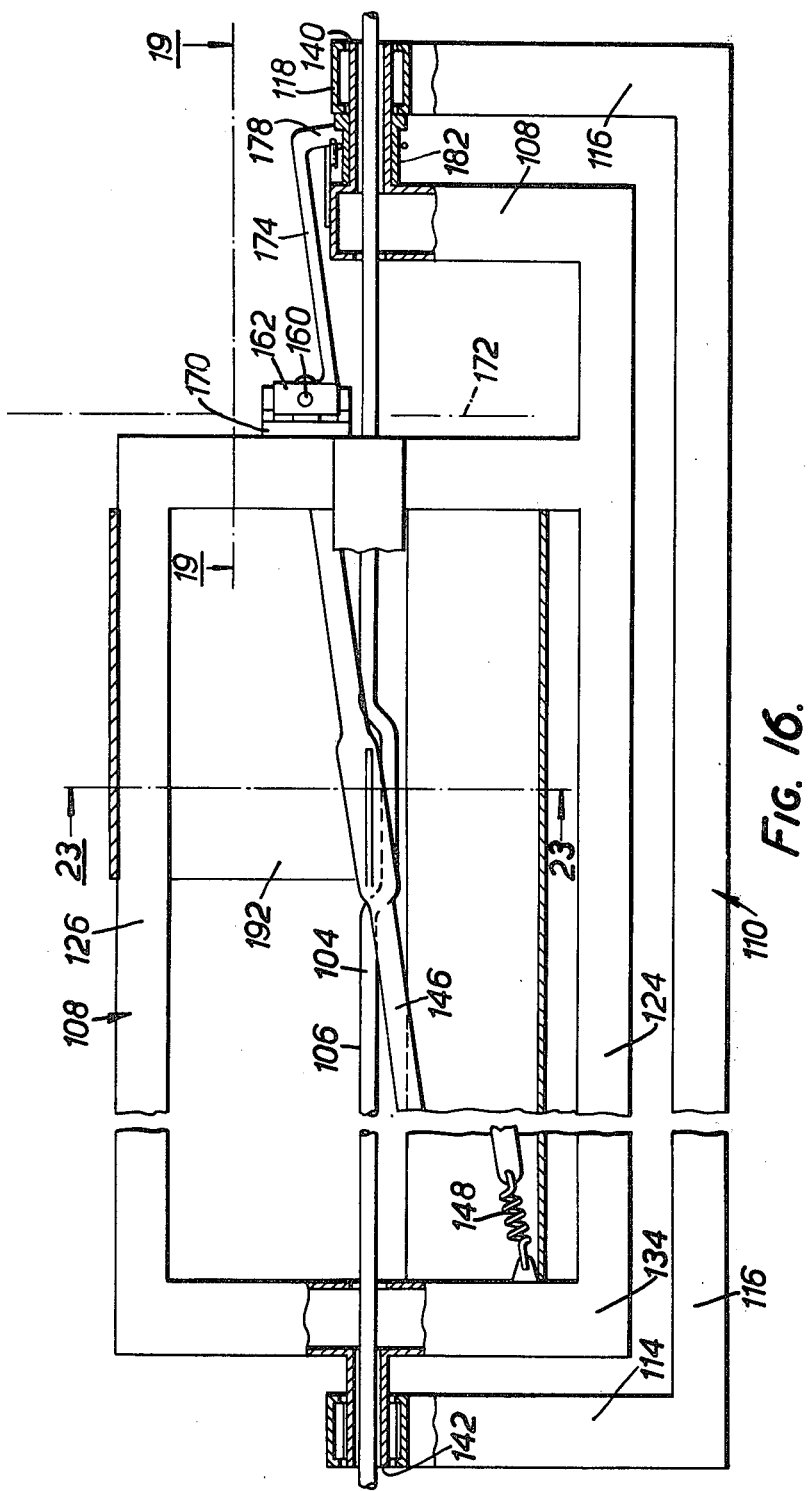

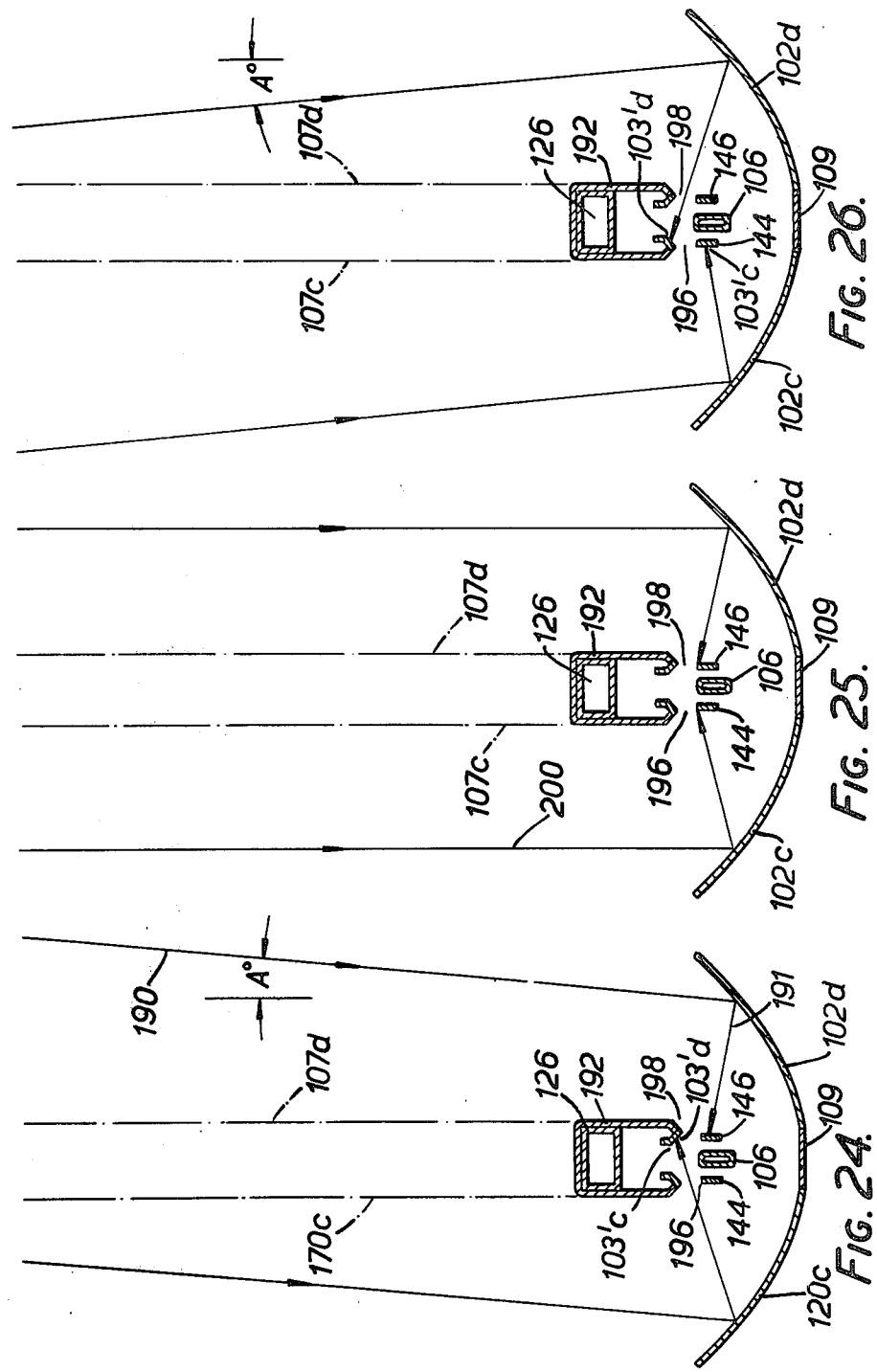

SOLAR TRACKING DEVICE

RELATED APPLICATIONS

This application is a continuation-in-part of co-pending application U.S. Ser. No. 704,674, filed July 12, 1976, now U.S. Pat. No. 4,089,323, filed in the names of the present inventor.

This invention relates to a solar tracking device and a solar energy converting apparatus incorporating the device.

The general object of the invention is to provide solar tracking systems which produce accurate tracking signals derived from solar energy. The signals are applied to drive means to cause a device, such as a reflective parabolic trough, to track the sun. In the preferred embodiment differential linear expansions are developed in elongate metallic members and such expansions constitute the tracking signals. The metallic members can be directly coupled to mechanical drive means to thereby accomplish solar tracking without the need to utilize external energy sources. Alternatively, the tracking signals could be applied to other known forms of drive means to effect the desired motion.

It is to be understood that, in relation to tracking about a single axis, the expression "directed at the sun" means that the optical plane of the tracking means lies in the plane which contains the tracking axis and the sun. Further, it is to be understood that an additional pair of heat extensible elements could be provided to accomplish bi-directional tracking.

Figure 5:
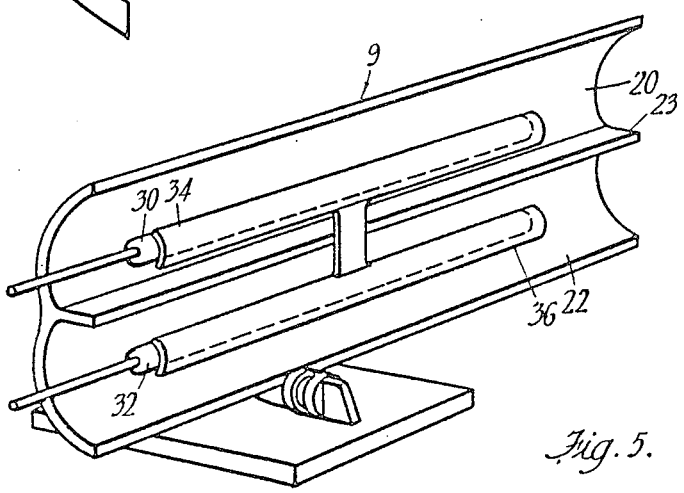
Figure 9:
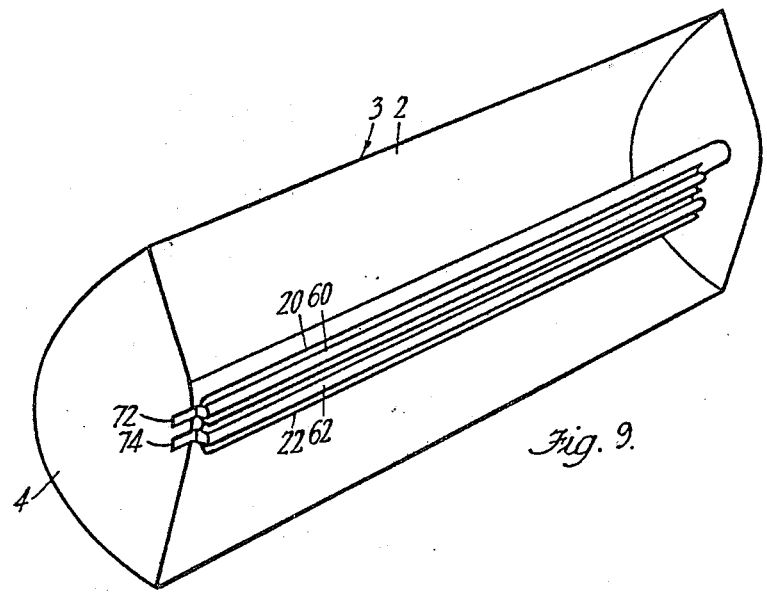
Figure 10:
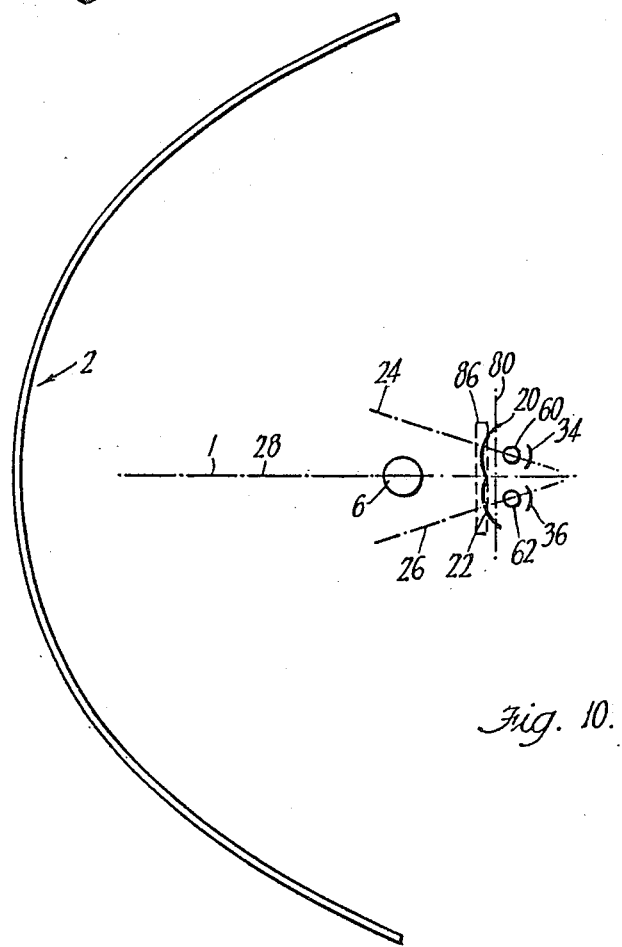
Figure 11:
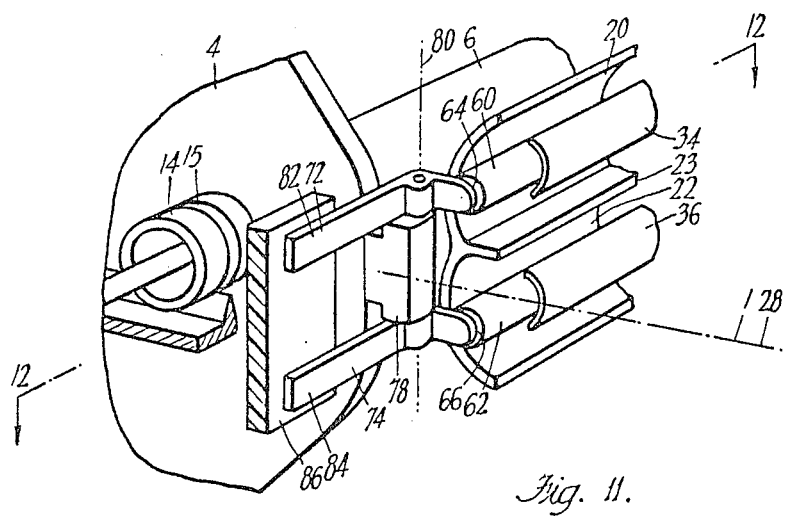
Figure 12:
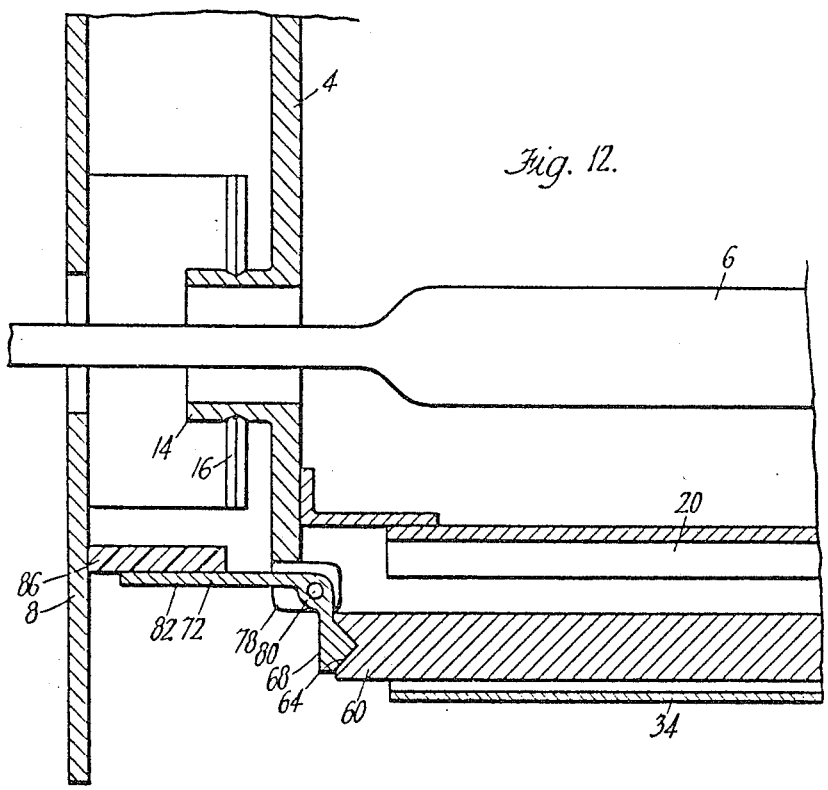
Figure 17:
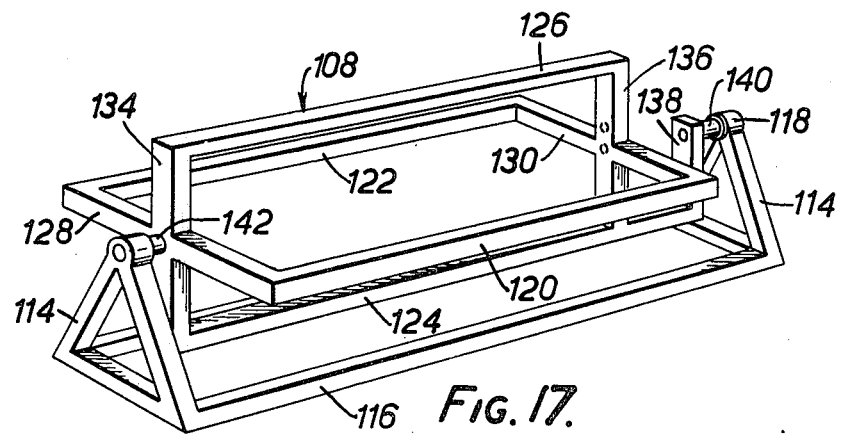
Figure 18:
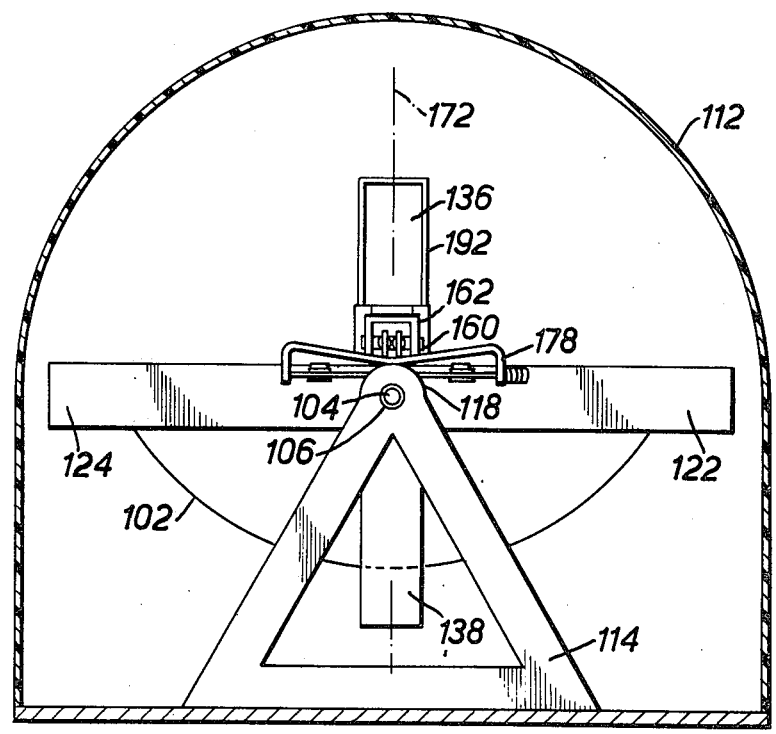
Figure 19:
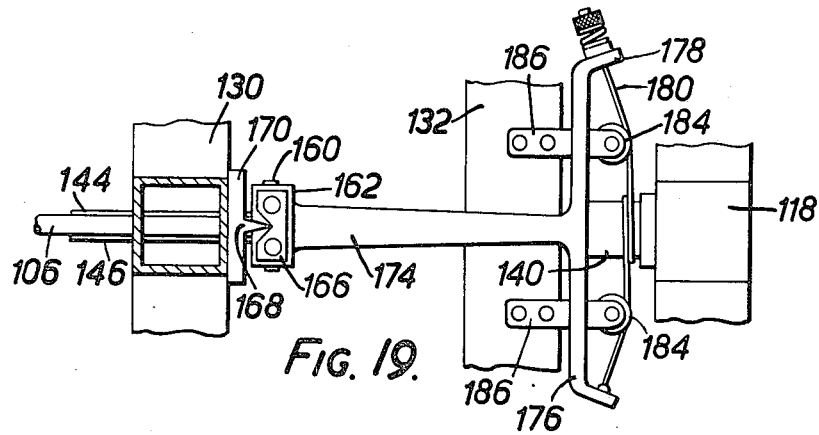
Figure 20:
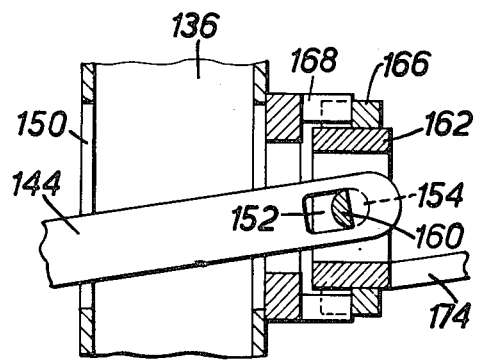
Figure 21:
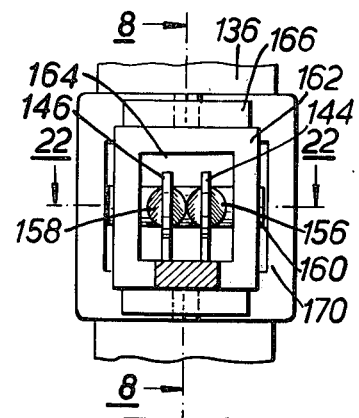
Figure 22:
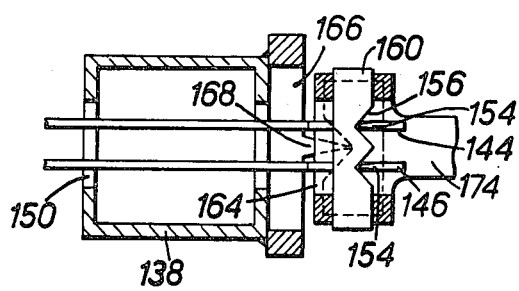
Figure 23:
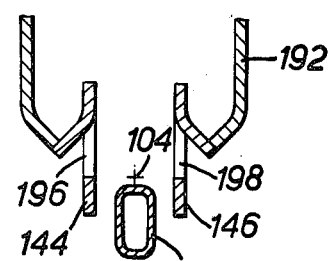
Figure 27:
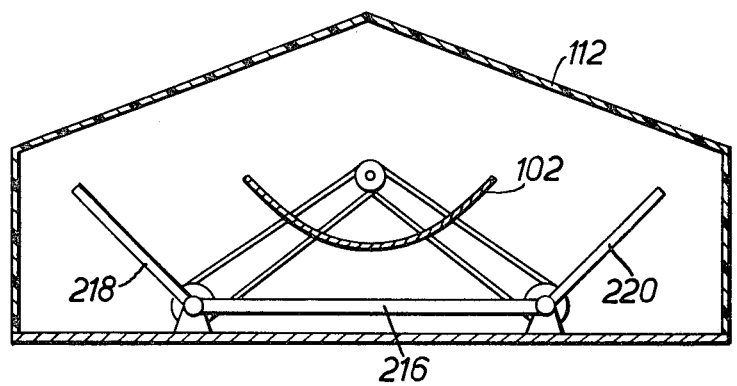
Figure 28:
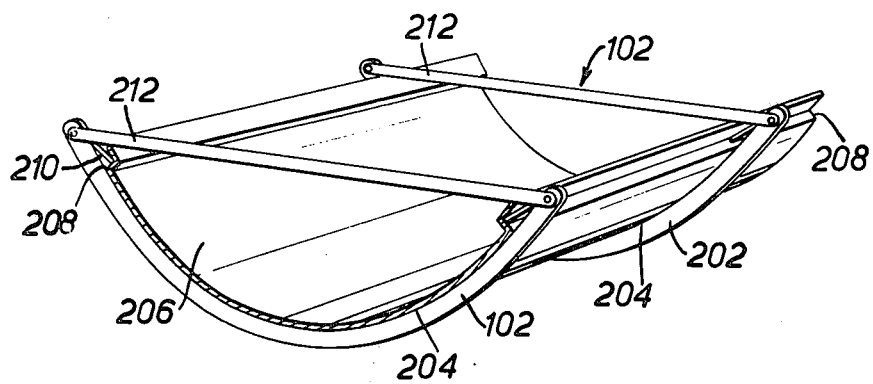
Figure 29:
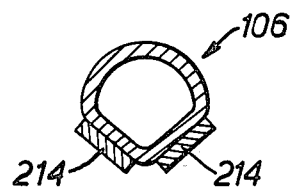

The invention will now be further described with reference to the accompanying drawings, in which:

FIG. 1 is a schematic perspective view of a solar energy converting apparatus incorporating the invention, FIG. 2 is an end view of the apparatus shown in FIG. 1, FIG. 3 is a corss-sectional view through an end of one form of target upon which solar energy is focussed FIG. 4 is a cross-section through a preferred form of tracking device constructed in accordance with the invention, FIG. 5 is a perspective view of a preferred form of tracking device constructed in accordance with the invention, FIGS. 6A and 6B are more detailed end views of the device shown in FIG. 5, FIG. 7 is a cross-sectional view of a different form of tracking device and, FIG. 8 is a more detailed view of part of the tracking device of the invention and its coupling to the parabolic reflector of the apparatus of FIG. 1, FIG. 9 is a schematic perspective view of the device mounted upon the trough 3, FIG. 10 is a schematic end view of the arrangement shown in FIG. 9, FIG. 11 is a more detailed perspective view of part of the arrangement shown in FIG. 9, and, FIG. 12 is a cross-sectional view taken along the line 12—12 marked on FIG. 11, and, FIGS. 13, 14 and 15 are diagrams useful in understanding the principles of operation of a further aspect of the invention, FIG. 16 is a longitudinal cross-section through a solar energy conversion apparatus embodying the invention, FIG. 17 is a perspective view of the supporting structure of the apparatus shown in FIG. 16 with some parts omitted for clarity of illustration, FIG. 18 is an end view of the arrangement shown in FIG. 16, FIG. 19 is a cross-sectional view taken on the line 19—19 marked on FIG. 16, FIG. 20 is a sectional view taken along the line 20—20 marked on FIG. 21, FIG. 21 is a sectional view taken along the line 21—21 marked on FIG. 16, FIG. 22 is a sectional view taken along the line 22—22 marked on FIG. 21, FIG. 23 is a sectional view taken along the line 23—23 marked on FIG. 16, FIGS. 24, 25 and 26 are schematic views corresponding generally to FIG. 20 and illustrating the principle of operation of the invention, FIG. 27 is a section through a modified form of the invention, FIG. 28 is a perspective view of part of a parabolic reflector constructed in accordance with an aspect of the invention, and FIG. 29 is a cross-section through a composite form of solar energy collecting tube constructed in accordance with the invention.

The solar energy converting apparatus shown in FIG. 1 comprises a reflecting trough 3 having a parabolic surface 2 with a principal optical plane 1 and end walls 4. A target tube 6 located along the focal line of the parabolic surface 2 is provided and serves to collect and transmit solar energy to a heat transfer fluid which passes through the tube 6.

The trough is housed within a housing 8 which is generally box shaped and made from sheet metal but having a glass face 12. The end walls 4 of the reflective trough 3 are mounted for rotation relative to the housing 8 by means of cylindrical sleeves 14 which extend outwardly from the end walls 4 of the trough and make rolling contact with respective knife edges 16 each of which is mounted on an end wall of the housing 8. This form of mounting, i.e. rolling contact on a knife edge, is chosen in preference to a pivotal rotation because it is very simple to attain very low frictional forces by this technique. It is necessary, of course, for correct balancing that the centre of gravity of the reflective trough 3 and all parts supported thereby pass through the centres of the sleeves 14. One of the sleeves is grooved at 15 to maintain correct axial spacing on the knife edges 16.

For efficient operation of the apparatus the reflective trough 3 should be mounted and rotated so that the surface of the target 6 always lies along the focal line of the trough. With a trough shaped reflector mounted such that the target 6 extends in the East-West direction it is only necessary to rotate the trough about a single axis to take account of seasonal elevation changes of the sun. The efficiency of the trough can be improved by making the inside surface of the end walls 4 highly reflective.

Regardless of the latitude of the site at which the apparatus is to be used, it is only necessary to allow for ±23° of movement about a mean position. At the equator, the mean position is directly overhead whereas, in Melbourne for instance, the mean position is at an elevation of 40°. Thus, the knife edges 16 need only be long enough to permit rolling contact of the sleeves 14 corresponding to a rotation of 46°. The knife edges 16 should be mounted on the housing 8 in such a way that they can be adjusted so that their edges extend horizontally, regardless of the orientation of the remainder of the housing. For instance, the knife edge 16 may be attached to the housing by means of screws which extend through slots of sufficient length to provide the required adjustment.

The tracking device of the invention enables the reflective trough 3 to be tracked so as to follow the seasonal elevation changes of the sun without the need for an external energy source. Energy derived directly from received solar energy is utilized for this purpose. The tracking device 9 in accordance with the invention is mounted on the reflective trough 3. One form of device 9 is illustrated in greater detail in FIG. 4. The device 9 comprises two parabolic reflecting surfaces 20 and 22 having respective focal planes 24 and 26. The focal planes 24 and 26 are not parallel to the plane of symmetry 28 of the device, but rather converge toward the plane of symmetry 28. The device is mounted on the surface 2 such that its plane of symmetry 28 is parallel to the principal optical plane 1 of the surface 2. The magnitude of angles which the focal planes make relative to the plane of symmetry is not critical to the device, as will be apparent from the description which follows. Associated with each reflecting surface 20 and 22 is a fluid filled bulb 30 and 32, which may be of the type used in the thermostatic control of gas valves in gas appliance The bulbs 30 and 32 extend along the focal lines of the surfaces 20 and 22. As best seen in FIG. 5, opaque shading members 34 and 36 are associated with the bulb 30 and 32 to prevent direct sun light from falling on the bulbs when the plane of symmetry 28 is directed at the sun. A partition 23 is provided between the surfaces 20 and 23 to prevent light from one surface from impinging upon the bulb of the other surface.

When the plane of symmetry 28 of the device is directed at the sun, solar energy will not be focussed upon the bulbs 30 and 32 since the axes 24 and 25 will not be directed at the sun. Instead, all rays reflected by the surfaces 20 and 22 will pass the bulbs on the chord lines marked 0°, which are both located inwardly of the bulbs. If however the device remains stationary and the sun moves say 5° upwards from the focal plane 28 all rays will pass along the chord lines marked 5°. As can be seen, the +5° chord lines are located beneath the respective 0° chord lines and thus the +5° chord line of the reflecting surface 20 is further spaced from the bulb 30 than its 0° chord line. However, in contrast, the +5° chord line of the reflecting surface 22 falls upon the bulb 32 and thus a significant amount of solar energy is focussed upon the lower bulb 32. Fluid expansion in the lower bulb 32 can be used to re-orient the device so that the focal plane 28 is again directed at the sun.

The operation of the device is similar for say a 5° downward orientation of the sun relative to the focal plane 28. It will be seen that the −5° chord line of the reflecting surface 20 falls on the bulb 30 whereas the −5° chord line of the lower reflector 22 is well clear of the bulb 32. The resultant increased temperature of upper bulb 30 is used to re-orient the device.

The figure of ±5° has been chosen merely for convenience of description. The angular deviation required before one of the bulbs 30 and 32 becomes heated depends upon a number of factors including the orientation of the focal planes 24 and 26, the focal length of the reflecting surfaces 20 and 22 and the physical dimensions and position of the bulbs 30 and 32. Similar results can be achieved if the focal planes 24 and 26 diverge instead of converging.

In an alternative embodiment, the focal planes 24 and 26 may be parallel to the plane of symmetry 28 and the bulbs 30 and 32 can be off-set either both inwardly or outwardly of their respective focal line.

In a still further embodiment, the bulbs may be heated directly by solar radiation and are so shaped that they receive equal amounts of solar radiation when the plane of symmetry of the device is directed at the sun and receive different degrees when the plane of symmetry is not so directed. For instance, in one such device 9' shown in cross-section in FIG. 7, the bulbs could be replaced by two elongated flattened tubes 40 and 42 which converge or diverge at equal angles relative to the plane of symmetry. With this configuration, when the plane of symmetry is not directed at the sun the projected areas, relative to the direction of the sun, are not equal thereby resulting in a difference of temperatures of the fluid within the tubes and enabling tracking movements to be made.

FIG. 8 illustrates one technique for causing the tracking movements of the surface 2 to be made. In this arrangement a U-shaped yoke 44 is connected to an end wall of the housing 8. An expandible bellows 46 and 48 is connected in the inward side of each leg of the yoke 44, and each bellows has a conduit 50 and 52 for fluid communication with the interior of the bellows. A projecting arm 54 is mounted on the end wall 4 of the surface 2 and its free end is located between the bellows 46 and 48.

The geometry of the arrangement is such that vertically directed forces on the arm 54 cause the sleeves 14 to roll on the knife edges 16 and, consequently alter the direction of the optical plane 1 of the parabolic surface 2. Fluid expansion within the bellows 46 and 48 causes extension thereof to engage and move the arm 54 to accomplish shifting of the optical plane 1 of the parabolic surface 2. With the tracking device 9, the conduit 50 is connected to the bulb 32 and the conduit 52 is connected to the bulb 30. When the plane of symmetry 28 (and consequently the optical plane 1) is directed at the sun neither of the bulbs will be heated appreciably and the bellows 40 and 48 will be retracted, when however the sun's rays are directed upwardly, relative to the plane of symmetry 28, the bulb 30 will quickly heat up and will cause expansion of the bellows 48. The bellows will expand and move the arm 54, as seen in broken lines in FIG. 8, until the plane of symmetry 28 is again directed at the sun whereupon the bulb 30 no longer receives intense heating from the surface 20 and thus the bellows 48 retracts. The arm 54 remains at the point where the bellows 48 retracted and thus the optical plane 1 is directed at the sun and maximum solar energy is received by the target 6. If there is any overshoot, the bellows 46 will operate to correct this.

As described above, once the plane 28 is directed at the sun the bellows 46 and 48 will be retracted and the trough will remain stationary. It is important therefore that, the trough 3 be correctly balanced on the knife edges 16. Further, it may be desirable to damp movement of the trough so that it is not displaced by small disturbances, such as vibration of the housing 8 caused by wind forces. A small leaf spring 60 contacting the sleeve 14 may be provided to place a small amount of static friction on the trough to reduce the possibility of inadvertent movement.

To account for any thermal inertia of the system or any small residual misalignments between the planes 1 and 28, the target 6 can be made relatively large i.e. of sufficient size that substantially all rays received by the surface 2 impinge on the target even with say 5° of misalignment between the planes 1 and 28. Similar effects can be achieved by pivotally mounting the surface 2 about a point spaced somewhat inwardly from its focal line, rather than pivotally mounting it about its focal line.

For the device 9', as illustrated in FIG. 7 the coupling arrangement to the arm 54 could be the same as that shown in FIG. 8. The coupling could, however, in this case be improved by providing compression springs between the inner ends of the bellows 46 and 48 and the upper and lower surfaces of the arm 54. Springs can be used in this arrangement because throughout normal operation both of the tube 40 and 42 will receive solar energy, and the bellows 46 and 48 will accordingly be at least partly extended.

FIGS. 6A and 6B show a form of mounting of the device on the surface 2 such that excessive temperatures are not generated at the target 6. Generally speaking, means is provided to mis-align the planes 1 and 28 when excessive temperatures are sensed, say in the liquid inlet to target 6 or other convenient locations.

The mounting arrangement comprises a base 70 attached to the upper edge of the parabolic surface 2. Pivotally mounted upon the base is a bracket 72 to which the surfaces 20 and 22 are connected. The bracket 72 is normally biassed in an anticlockwise direction (as seen in FIGS. 6A and 6B) into engagement with an abutment 74 by a compression spring 76. In this position, the plane 28 is parallel to the plane 1. To the rear of the bracket 72 is located a bellows 78 which is connected to a member 80 which projects from the base, the arrangement is such that when an excessive temperature is reached in the heat transfer fluid, the bellows 78 extends and rotates the bracket 72 relative to the base 70, as seen in FIG. 6B. The planes 28 and 1 are now no longer parallel.

Once the bracket 72 has been rotated the plane 28 will initially be not directed at the sun but heating of the bulb 32 will occur and will cause the bellows 46 to operate until the plane 28 is again directed at the sun. The plane 1 is now mis-aligned with the direction of the sun and heat is not focussed on the target 6 by the surface 2. Other techniques are possible for causing de-focussing to prevent over-heating but the one described above has the advantage that the bulbs 30 and 32 are not constantly irradiated while the main reflecting surface is out of alignment with the sun.

The degree of extension of the bellows 28 has been exaggerated in FIG. 8 for clarity. In practice, the device can be made operable with quite small degrees of extension by arranging for the bellows to be close to the sleeves 14.

Many modifications and refinements may be made to the apparatus, for instance, the trough 3 and its mountings could be made somewhat more robust to remove the need for housing 8. The presence of the shading elements 34 and 36 is not essential to the working of the device.

The bulbs 30 and 32 need not be along the true focal lines of their respective surfaces 20 and 22. Indeed, if the bulb 30 is shifted outwardly and upwardly, relative to its focal line the chord lines can be made to more closely approximate arcs of circles (as seen in cross-section) and thus, more of the suns rays will be incident upon the surface of the bulb 30. The same applies for the bulb 32 if it is shifted outwardly and downwardly, relative to its focal line.

In a modified arrangement, the fluid systems could be replaced by solid bodies, and reliance could be placed upon thermal expansion of the solid bodies to effect tracking movements of the device. For instance, in the arrangement of FIG. 4, the bulbs 30 and 32 could be replaced by metallic rods, one of which will be intensly heated when the plane 28 is not directed at the sun. The resultant thermal expansion in that rod can be mechanically coupled to rotate the trough 3 in the required manner. It will be appreciated that thermal expansion in a rod can be used to generate large forces, if necessary, which can be used to effect the tracking movements of the trough. In still further forms the rods could be replaced by bi-metallic elements to produce more pronounced expansions.

In the arrangement illustrated in FIGS. 9 to 12, the surfaces 20 and 22 extend across the front of the trough 3 just forwardly of the target 6 and the plane of symmetry 28 of the tracking device is coincident with the optical plane 1 of the trough. The bulbs 30 and 32 are replaced by elongated metal rods 60 and 62 one end of each of which is fixed relative to the trough 3 and the other end of each of which is free to move, axially following thermal expansion of the rods. As best seen in FIG. 12 the free end of each rod is countersunk and the countersunk ends co-operate with conical projections 64 and 66 provided on the shorter legs 68 and 70 of L-shaped levers 72 and 74. The levers 72 and 74 are pivotally mounted to a boss 78 located on a forward portion of the end wall 4 of the trough 3 for rotation about an axis 80, which is normal to the optical plane 1 of the surface 2. The longer legs 82 and 84 of the levers 72 and 74 extend generally parallel to their respective rods 60 and 62 and co-operate with a flange 86 projecting from the inner surface of an end wall of the housing 8. The arrangement is such that when the plane of symmetry 28 is not directed at the sun one or other of the rods 60 or 62 is intensly heated and thermal expansion of that rod causes clockwise rotation (as seen in FIG. 12) of its associated lever. Anticlockwise rotation of the lever 72 will cause clockwise rotation of the surface 2 (as seen in FIG. 10) whereas anticlockwise rotation of the lever 74 will cause anticlockwise rotation of the surface 2 (as seen in FIG. 10) so that, in this way, tracking movements can be made. Light biasing springs could be provided to bias the conical projections 64 and 66 into the countersunk ends of their associated rods 60 and 62. It is equally possible to arrange for the levers 72 and 74 to rotate about horizontal axes and engage a flange or flanges which extend horizontally to effect the required rotation.

In a slightly modified arrangement both the levers 72 and 74 can be made to act upon the flange 86 simultaneously so as to hold the trough 3 steady when subjected to wind forces. Both rods can be heated simultaneously by omitting the shading elements 34 and 36 and by defocussing, i.e. locating the rods 60 and 62 at off-set positions relative to the focal lines of the surfaces 20 and 22. One of the rods will be more intensly heated than the other when the plane 28 is not directed at the sun and thus its expansion will be dominant. Resilient means could be incorporated into the arrangement to prevent damage to the device, for instance, the levers 72 and 74 may act upon the flange 84 through compression springs, or the fixed ends of the rods 60 and 62 could be connected via springs to the trough 3.

The device described about has the advantage that the weight of the rods serves as a counterbalance for the weight of the reflecting surface 2.

A preferred form of apparatus employing expansion of solid rods will now be described with particular reference to FIGS. 13 to 26.

FIG. 13 is a cross-section through a parabolic trough 102 (shown in full lines) and having a focal line 103. A well known property of parabolas is that all rays 105 impinging on the trough and parallel to the principal plane 107 are reflected through the focal line 103. When the trough is used for collecting solar energy heat absorbing means is located along the focal line and thus is subjected to high temperatures.

FIG. 13 illustrates that the profile of the parabola can be altered as illustrated by the parabolas 102a and 102b shown in broken and chain lines respectively without losing any energy gathering performance and so provide flexibility in the location of the trough relative to the focal line 103.

FIG. 14 illustrates a parabola which is essentially the same as the example shown in full lines in FIG. 13 except that it is split into two portions 102c and 102d which are spaced by a distance D. Each portion produces its own focal line 103c and 103d respectively, the focal lines 103c and 103d being separated by the distance D. A single heat absorbing member can be located so as to have energy focussed thereon from the two portions 102a and 102b.

Referring back to FIG. 13 the single parabola can be considered as two rotational portions which lie on the same parabolic surface and thus the respective focii of the two portions are co-incident at the true focus 103 of the trough.

FIG. 14 also illustrates the effect of light impinging upon the trough portions at angles A° relative to the principal plane 107c and 107d of the trough portions. It will be noted that the sharp focal lines become somewhat defocussed and such defocussed lines will be referred to hereinafter as "quasi-focal lines". Further, a deviation of A° to the left as seen in FIG. 14 the quasi-focal line 103c migrates somewhat downwardly and inwardly relative to the true focal line 103c and the quasi-focal line 103d moves upwardly and outwardly. Correspondingly, when the deviation angle A° is to the right the quasi-focal line 103c moves upwardly and outwardly and the quasi-focal line 103d moves downwardly and inwardly. The two portions 102c and 102d could of course be formed from part of a single trough which has a flat interconnecting the two parabolic portions. FIG. 15 illustrates a more complicated trough made up from a plurality of integral parabolic segments 102e to 102j but again forming spaced focal lines 103c and 103d.

In the invention the property of migration of the quasi-focal lines is used to effect tracking movements by arranging for the quasi-focal lines to migrate onto heat sensitive elements, to thus selectively heat some of the heat sensitive elements depending upon the direction of the misorientation. It will thus be appreciated that any of the troughs illustrated in FIGS. 13 to 15 would be useful in the invention.

The solar energy conversion apparatus illustrated in FIGS. 16 to 27 comprises a reflective trough 102 having parabolic portions 102a and 102b having focal planes 107c and 107d and connected by a flat 109 and operates in the manner illustrated diagrammatically in FIG. 14. The trough 102 is mounted for rotation about an axis 104 which is midway between the focal lines 103c and 103d of the parabolic portions of the trough. A target tube 106 for passage of a heat transfer fluid extends along the axis 104 but has dimensions such that the focal lines 103c and 103d impinge on or near its surface. The trough 102 is carried by a trough support structure generally indicated by 108, the structure 108 being mounted for rotation in a framework 110. The trough support structure 108 and framework 110 are mounted within a housing 112 (which has only been illustrated in FIG. 18 for clarity of illustration). The upper part of the housing 112 is made from glass or acrylic material so as to be substantially transparent to solar energy.

Referring now more particularly to FIG. 17, the framework comprises a pair of triangular end supports 114 the lower parts of which are interconnected by two elongate lower beams 116, the apices of the triangular supports 114 carrying bearings 118 for mounting the trough support structure 108. The trough support structure 108 comprises four elongate beams 120, 122, 124, and 126, the beams 120 and 122 providing support for the side edges of the trough 102 by means of ribs (illustrated in FIG. 28), the beam 124 running slightly below the bottom of the trough 102. The beam 126 extends above the trough and serves to impart rigidity to the support structure 108. The beams 120 and 122 are interconnected by three transverse beams 128, 130 and 132 and the beams 124 and 126 are interconnected by transverse beams 134 and 136. In addition, a short transverse beam 138 connects one end of the beam 124 to the transverse beam 132. The framework 108 has a pair of tubular spigots 140 and 142 which project outwardly from the end transverse beams 128 and 132 and are received within the bearings 118 so that the support structure 108 is rotatably mounted within the framework 110.

The arrangement for effecting tracking movements of the trough will now be described. The arrangement includes two heat expansible metallic rods 144 and 146 which are generally parallel and one end of each is connected to the transverse beam 134 just above the flat 109 at the bottom of the trough by means of a tension spring 148. The rods are preferably connected to a block (not shown) to which the spring 148 is connected and guide means is provided for restraining any rocking or sideways movement of the block and hence of the rods 144 and 146. The rods 144 and 146 lie in planes which are parallel to and closely spaced to the focal planes 107c and 107d. As seen in FIG. 16, the rods 144 and 146 extend generally diagonally with respect to the focal lines 103c and 103d and their upper portions project from the trough and extend through an opening 150 formed into the transverse beam 136. As best seen in FIG. 20, the ends of the rods 144 and 146 are formed with openings 152, the forward portions of which are formed with pointed edges 154 which are located within respective V-notches 156 and 158 formed into a shaft 160 as best seen in FIG. 22. The shaft 160 extends between a pair of sides of body 162 having a central rectangular opening 164. The upper and lower ends of the body 162 are formed with V-notches 166 which receive knife edges 168 projecting outwardly from a mounting plate 170 which is connected to the upright transverse beam 136, as best seen in FIG. 19. The body 162 is held in engagement with the knife edges 168 by means of the tensile forces from the tension spring 148 transmitted through the rods 144 and 146. Thus, the body 162 is rotatable about an axis 172 which passes through the tips of the knife edges 168 and is perpendicular to the axis 104 of the trough or to the rods 144 and 146.

The body 162 has extending therefrom an arm 174 which terminates in a cross arm 176 having two downwardly extending portions 178. The downwardly extending portions 178 serve as mounting points for a piano wire 180 which convolutes about a drum 182 which extends inwardly from the bearing 118. The wire 180 passes about a pair of rollers 184 which are mounted upon arms 186 projecting outwardly from the beam 132, the rollers 184 serving to maintain the lead-in and lead-out portions of the wire 180 about the drum 182 as two tangents to the drum 182.

In operation, the rods 144 and 146 cause rotation of the body 162 about the axis 172 thus causing rotation of the arm 174 and consequently movement of the piano wire relative to the drum 182. Such rotation of the arm 174 causes part of the wire 180 to wind onto the drum and a corresponding part to unwind from the drum accompanied by a rotation of the trough support structure 108 about the axis 104 of the trough.

In an alternative arrangement, the piano wire 180 could be replaced by a curved rack gear which meshes with a tooth gear which would replace the drum 182. Such a geared arrangement would function in a similar manner to the wire and drum arrangement as illustrated. In a further modified arrangement, the trough support structure 108 and components carried thereby are arranged to be balanced so that the centre of gravity of the rotatable assembly is co-incident (or nearly so) with the axis 104 of the trough. In such an arrangement, the body 162 is connected to symmetrically disposed weights which, when the body 162 is rotated from its central position are shifted and so alter the overall centre of gravity of the rotatable assembly. The unbalanced assembly will then rotate in the appropriate direction so as to realign the focal plane of the trough with the sun. In one form of such apparatus the weights could be located in positions which correspond generally to the positions of the downwardly extending portions 178, but inwardly over the trough.

The rods 144 and 146 are located generally beneath the upper support beam 126 and when the trough is directed at the sun, the beam 126 shades the rods from direct sunlight. Except at the region where the rods 144 and 146 cross-over the focal lines 103c and 103d of the trough, the rods will not receive any solar energy reflected from the trough when the trough is directed at the sun. In the region of cross-over of the rods with the focal lines, the rods will receive generally equal amounts of solar energy and any consequential thermal expansion of the rods will be the same in each rod and will not cause rotation of the body 162. Any slackness in the rods will be taken up by the spring 148 which also serves to compensate for the effects of changes in ambient temperature.

When the focal planes 107c and 107d of the trough are not directed at the sun the focal lines 103c and 103d become guasi-focus lines one of which moves laterally and downwardly relative to the true focal line and the other of which moves in generally the opposite direction that is upwardly and laterally in the opposite direction to the other quasi-focal line as illustrated diagramatically in FIG. 14. As seen in FIG. 24, where there is a deviation of A degrees between the sun's rays 190 and the focal plane 107d, the reflected rays 191 will form a quasi-focal line 103d which impinges upon the rod 146 and so causes expansion thereof. The other quasi-focal line 103c will be above the rod 144 except for the portion which is above the level of the focal line 104. However, this area of the rod 144 (and of the rod 146) is shielded from reflected radiation by means of a U-shaped reflective tunnel 192 which extends over the beam 126 and downwardly to the level of the axis 104 of the trough. Expansion of the rod 146 will cause the body 162 to pivot in an anti-clockwise direction as seen in FIG. 19 which will thus cause the trough support structure 108 to rotate clockwise (as seen in FIG. 24) by virtue of the interconnection of the wire and drum 180 and 182. The clockwise rotation of the trough support structure will continue to a point where the focal planes 107c and 107d are parallel with the incident radiation 190 whereupon both rods 144 and 146 will again receive the same amount of radiation and rotation will cease with the focal plane being correctly aligned with the sun, as shown in FIG. 25.

A similar effect takes place when the sun's rays 194 are offset by an angle minus A degrees as seen in FIG. 26. This time the inward quasi-focal 103c line is focussed upon the rod 144 and the rod 146 does not receive any reflected radiation. Heating of the rod 144 will cause rotation of the body 162 in a clockwise sense as seen in FIG. 19 and this will produce rotation of the trough support structure 8 in an anti-clockwise sense as seen in FIG. 26 to correctly align the focal planes 107c and 107d with the sun's rays.

It will thus be appreciated that the tracking arrangement described herein can effect tracking movements of the trough without the need for any external energy input and relies solely on received solar radiation.

In the illustrated arrangement, the rods 144 and 146 include slots 196 and 198 located generally at the region of intersection of the rods with the focal lines 103c and 103d of the trough. The purpose of the slots is to effectively double the amount of radiation available for fine tuning of the trough when at or near the point of correct alignment with the sun. As illustrated in FIG. 25 where the sun's rays 200 are parallel to the focal planes 107c and 107d of the trough the reflected rays will just impinge upon the lower portions of the rods 144 and 146 adjacent to their respective slots 196 and 198. When however the sun's rays are separated by an angle A as shown in FIG. 24 the quasi-focal line 103c will also impinge upon the rod 146, rays from the parabolic portion 102c passing through the slot 196 and impinging upon the rod 146. The quasi-focal line 103d will still impinge upon the rod 146 as before and thus the provision of the slots greatly increases the amount of heat applied to the rod 146 for effecting the necessary correcting movement. FIG. 26 illustrates a similar effect with a deviation angle of minus A degrees. The target tube 106 is flattened and bent downwardly adjacent to the slots so as not to obstruct light passing through the slot in one rod to the other rod, as seen in FIG. 16.

In the embodiment of FIGS. 16 to 26 the trough is balanced such that in the absence of any direct solar radiation the trough will return to a position in which the focal planes are vertical. Thus in the night or when the sun is behind thick cloud the trough 102 will be at the noon position which may be very substantially misaligned with the actual direction of the sun. For instance, in the morning when the sun rises the deviation is approximately 90° and no rays can strike the reflective part of the trough to initiate tracking. This potential problem is avoided by having the top edges 230 of the trough below the level of the focal lines 103c and 103d so that the sun's rays can directly impinge upon one of the rods 144 or 146 in the region above the top edges 230 of the trough and below the focal lines 103c and 103d, as can be appreciated from FIG. 16. Once one of the rods 144 or 146 has been heated it will cause at least some rotation of the trough and then the reflective interior of the trough will become effective. As the trough rotates to correct alignment the quasi-focal 103d or 103c will gradually move up the rod 146 or 144 (depending upon the direction of the misorientation) until the slots 198 or 196 are reached and thereafter correct tracking will continue as long as direct solar radiation is received.

In a prototype apparatus of the type illustrated in FIGS. 16 to 26, it has been found that a torque of approximately 650 cm-gms is required to rotate the trough from its rest position through 90° so that the focal planes 107c and 107d are directed to the west or east. When the sun is at or near these extreme positions it is at its weakest but maximum torque is required at these times. The potential problem can be off-set by loading the trough by means of eccentric weights or springs which assist the trough in moving to its extreme positions this can be done by putting a weight on the top bar 126 of trough support structure which at the due east or due west position has a downward torque of just less than 650 cm-gms, the torque required to effect rotation through 90°. With this modification the apparatus has little difficulty in tracking the sun even when the received rays are very weak. A similar effect can be achieved by relying upon thermal expansion of the bar 126 which tends to bow outwardly thus increasing its effective torque when the focal planes 107c and 107d are not vertical. The effectiveness can be increased by painting the bar 126 with absorbtive paint and thermally shielding the lower bar 124.

FIG. 28 illustrates a preferred arrangement for forming the trough 102 of the invention. It comprises a plurality of ribs 202 each of which has a parabolic edge 204. A sheet 206 of reflective material such as aluminium is pressed so as to engage the edges 204 of the ribs and the natural resilience of the sheet 206 tends to maintain intimate contact with the sheet and the parabolic edges 204. The sheet 206 is held in engagement by means of compression members 210 which act between the upper ends of the ribs 202 and outwardly directed recesses 210 formed along the upper edges of the sheet 206. Further, the upper ends of the ribs 202 may be interconnected by tie members 212 to prevent excessive deflection of the ribs 202.

The ribs 202 may be formed with or without flats to produce a trough having a flat 109 or a single parabolic trough. The tops of the ribs may of course extend well above the side edges of the sheet 206 and serve as mounting points in with the trough support structure.

FIG. 29 shows a cross-sectional view through a modified form of heat transfer tube 106. In this arrangement, the heat transfer tube has mounted thereon two rows of photo electric conversion elements 214. The photo electric elements 214 are arranged to have solar energy focussed upon them from the trough 102 and excessive overheating of the photo electric elements is avoided by arranging for them to be in intimate thermal contact with the heat transfer tube 106 which thus serves as a cooling agent for the elements 214. Such an arrangement has the advantage that it produces a certain proportion of electrical energy and the heat used to cool the elements 214 is imparted to the heat transfer fluid in the tube 106 and thus is utilised in the normal manner. With the form of heat transfer tube illustrated in FIG. 29, it would be preferred to arrange for the tube to be rotated with the trough 102 so that the solar radiation focussed upon the elements 214 is incident perpendicularly with respect to the surfaces of the elements 214. In such an arrangement, rotatable fluid couplings would be required for the ends of the heat transfer tube 106.

In a modified form of the invention the trough 102 could be made up from a row of dome portions arranged to more intensely heat some areas of the target 106. In such an arrangement it would be desirable to track in elevation as well as azimuth but the former could be effected by clockwork or manually since the daily adjustment needed is small.

A modified form of the invention is illustrated in cross-section in FIG. 27. In this arrangement, a trough 102 which is arranged to track the sun is again mounted within a housing 112. The arrangement used for effecting tracking movements of the trough 102 can be the same as that illustrated in FIGS. 16 to 26 but his is not essential. Mounted beneath the trough 102 is one or a number of black plate solar absorbers 216 which will receive various amounts of solar energy depending upon the orientation of the trough 102 with respect to the housing. Further, the absorbers 216 will also receive diffuse solar radiation which is essentially not utilised by the trough 102. In order to improve the performance of the absorbers 216 a pair of reflective plates 218 and 220 may be provided so as to reflect light onto the absorbers 216. The reflectors can be fixed in location and in such a case it is preferred that they be set at about 45° with respect to the focal plane 107 of the trough 102, as illustrated. However, it is preferred that the reflectors 218 and 220 be coupled to the trough 102 so as to rotate therewith to thereby reflect more light towards the absorbers 216. Maximum performance can be obtained by arranging for the rate of rotation of the reflectors 218 and 220 to be approximately half the rate of rotation of the trough 102. This can of course by simply effected by having a drive sprocket or pulley mounted upon the shaft carrying the trough 102 coupled by means of chains or drive bands to sprockets or pulleys of different diameters to that provided on the trough shaft. Such a coupling will provide rotation in the required sense and at the required rate of rotation relative to that of the trough 102.

The arrangement illustrated in FIG. 27 can be used most advantageously in a hot water system. The heat transfer tube 106 is arranged to draw from and to return very hot water to the upper part of a hot water storage tank, whereas the absorbers 216 are arranged to draw from and to return relatively warm water to the lower part of the same tank. Hot water to be used is drawn from the top of the tank, where the water is hottest and cold water is replaced at the bottom of the tank.

The expression "substantially equal amounts of heat from solar energy when the tracking means or axis is directed at the sun" includes the case where the heat sensitive members are shielded from the sun, as is evident from the illustrated embodiments.

I claim:

1. Solar tracking apparatus for tracking the sun comprising focusing means having first and second portions on opposite sides of a tracking plane to be directed at the sun, mounting means mounting the focusing means for tracking movements of the sun, drive means including first and second solar radiation sensitive elements movable with said focusing means, said first and second elements being disposed on opposite sides of said tracking plane but on the same sides as said first and second portions of the focusing means respectively, the disposition of the elements relative to the focusing means being such that (a) when the tracking plane is misaligned with the sun in a first sense, the first element receives solar radiation from the first portion of the focusing means and (b) when the focusing means is misaligned with the sun in a second sense opposite to the first sense, the second element receives solar radiation from the second portion of the focusing means, the drive means including actuating means responsive to differential exposure of said elements to solar radiation to control movement of the focusing means in a direction towards realignment of its tracking plane with the sun.

2. Apparatus as claimed in claim 1 wherein the focusing means comprises a reflective parabolic trough.

3. Apparatus as claimed in claim 1 or 2 wherein said first and second elements are elongate and parallel to one another.

4. Apparatus as claimed in claim 1 or claim 2 wherein said first and second portions have first and second focal lines respectively.

5. Apparatus as claimed in claim 4 wherein the said focal planes are parallel and each spaced by a distance d from the tracking plane on opposite sides thereof.

6. Apparatus as claimed in claim 5 wherein said first and second elements are each spaced by said distance d from said tracking plane on opposite sides thereof.

7. Apparatus as claimed in claim 5 wherein the mounting means mounts the focusing means for rotation about a rotation axis which is parallel to, between and equidistant from the first and second focal lines.

8. Apparatus as claimed in claim 4 wherein said elements comprise metallic members which are generally parallel to the said focal lines when the trough is viewed in plan but extend diagonally relative to said focal lines when viewed in side elevation.

9. Apparatus as claimed in claim 8 wherein the drive means includes a body which is mounted for rotation relative to the trough about a second axis which intersects and is perpendicular to said focal lines, one end of each of said members being coupled to said body at points on opposite sides of said second axis whereby expansion of one or other of the rods causes rotation of the body about said second axis.

10. Apparatus as claimed in claim 9 wherein said parabolic portions are formed as a single trough which is carried by a trough support structure mounted for rotation about said rotation axis in a framework, said drive means including a drum fixedly carried by the framework, an arm extending from said body and a line extending from the arm about said drum whereby rotation of said body causes relative movement between the line and the drum to thus cause rotation of the trough support structure relative to the framework.

11. Apparatus as claimed in claim 10 wherein the arm is generally T-shaped and has one leg extending generally parallel to the rotation axis and a cross-leg generally perpendicular thereto, the ends of said line being connected to ends of said cross-leg and said line convoluting at least once about said drum.

12. Apparatus as claimed in claim 9 wherein the focusing means is carried by a support structure which is mounted for rotation about said rotation axis in a framework, the centre of gravity of the support structure and focusing means being at or near said rotation axis, said body having a weight connected thereto, which, when said body is rotated by expansion of one of said metallic members, causes the support structure and focussing means to become unbalanced and thus rotates under gravity about said rotation axis.

13. Apparatus as claimed in claim 10 wherein the metallic members extend from a point near the surface of the trough and project from the top of the trough when viewed in side elevation, the parts of said rods above said focal lines being thermally shielded.

14. Apparatus as claimed in claim 13 wherein the metallic members have slots at locations adjacent said focal lines, said slots being parallel thereto.

15. Solar energy collecting apparatus comprising tracking apparatus as claimed in claim 11 or claim 13 or claim 14 and energy collecting means located to receive reflected energy at said first and second focal lines.

16. Apparatus as claimed in claim 15 wherein the collecting means comprises a tube through which heat transfer fluid is passed.

17. Apparatus as claimed in claim 16 wherein said tube is stationary relative to the trough.

18. Apparatus as claimed in claim 15 including photo electric elements mounted upon the tube.

19. Solar energy collecting apparatus comprising solar tracking apparatus as claimed in claim 1 and arranged to focus solar energy on energy collecting means, said tracking means being mounted in a housing which is substantially transparent and a plate-type solar energy absorber, located generally beneath said tracking apparatus and within said housing.

20. Apparatus as claimed in claim 19 wherein said energy collecting means comprises a tube for transmitting heat transfer fluid, said absorber being coupled to said tube and acting as a preheater for said heat transfer fluid.

21. Apparatus as claimed in claims 19 or 20 wherein there is provided reflectors for reflecting solar energy towards said absorber.

22. Apparatus as claimed in claim 21 wherein the reflectors are within the housing.

23. Apparatus as claimed in claim 22 wherein the reflectors are coupled to the tracking apparatus and are arranged to be moved thereby.

24. Apparatus as claimed in claim 23 wherein the reflectors are arranged to rotate in the same sense but at approximately half the rate of rotation as the trough.

25. Solar conversion apparatus comprising:
concentrating means, including a reflective surface, for concentrating solar energy onto at least one surface,
tracking means for causing the concentrating means to track the sun,
said tracking means including first and second elongate metallic members which are dispose relative to the concentrating means to receive solar energy from said reflective surface to be differentially heated by solar energy when the concentrating means is misaligned with the sun, the differential heating of said metallic members producing differential thermal linear expansions thereof and drive means for producing tracking movements of said concentrating means in response to said differential linear expansions of said metallic members.

26. Solar conversion apparatus as claimed in claim 25 wherein said elements are shaded from direct incident solar radiation when the concentrating means is correctly aligned with the sun and receive solar energy reflected from the concentrating means when the concentrating means is mis-aligned with the sun.

27. Solar conversion apparatus as claimed in claim 26 wherein the tracking means further includes further a heat or light sensitive element or elements whch are operable to cause rotation of the concentrating means when said concentrating means is grossly mis-aligned with the sun, said further element or elements being arranged to receive and be responsive to direct solar radiation when said concentrating means is grossly misaligned with the sun.

28. Solar conversion apparatus as claimed in claim 26 or 27 wherein said elements extend from said reflective surface to said surface onto which solar energy is concentrated.

29. Solar conversion apparatus as claimed in claim 25 or 26 wherein said reflective surface comprises a trough of generally parabolic configuration.

30. Solar conversion apparatus as claimed in claim 29 wherein said elements extend diagonally from the trough to said surface.

31. Solar conversion apparatus as claimed in claim 30 wherein said trough has first and second parabolic portions which have first and second focal lines which are parallel to one another the first and second portions being operable to concentrate solar energy on first and second surfaces at said first and second lines respectively when the concentrating means is correctly aligned with the sun.

32. Solar conversion apparatus as claimed in claim 31 wherein there are first and second of said diagonally extending metallic elements which extend in first and second planes respectively said first plane including the inner edge of said first parabolic portion and said first focal line and the second plane including the inner edge of the second parabolic portion and said second focal line.

33. Solar converting apparatus as claimed in claim 32 wherein said trough is mounted for rotation about a rotation axis which is parallel to and between said first and second focal lines.

34. Solar converting apparatus as claimed in claim 27 wherein said further heat or light sensitive elements or element comprise an extension of said first or second metallic element, said extension being located generally outside said trough.

35. Apparatus as claimed in claim 25 wherein said members are straight.

36. Apparatus as claimed in claim 25 or 35 including means to maintain said members in tension.

37. Apparatus as claimed in claim 25 or 35 wherein said members are of rectangular cross-section.

38. Solar energy conversion apparatus comprising concentrating means for concentrating solar energy onto a surface and tracking means for effecting tracking movements of the concentrating means wherein the concentrating means has first and second portions operable to concentrate the solar energy into first and second spaced, parallel focal lines which are located on said surface when the concentrating means is correctly aligned with the sun and wherein said tracking means includes first and second solar energy sensitive elements which are so located relative to the first and second portions such that when the concentrating means is misaligned with the sun either (a) solar energy from the first portion is concentrated onto said first element or (b) solar energy from second portion is concentrated onto said second element depending upon the sense of misalignment.

39. Apparatus as claimed in claim 38 wherein said first and second portions of said concentrating means are reflective parabolic portions.

40. Apparatus as claimed in claim 39 or 38 wherein said concentrating means is mounted for rotation about a rotation axis which is parallel to said focal lines and between said focal lines.

41. Apparatus as claimed in claim 39 or 38 wherein said first and second parabolic portions have first and second inner edges which are adjacent and parallel to one another, and wherein said first element is located in a first plane which includes said first edge and said first focal line and said second element is located in a second plane which includes said second edge and said second line.

42. Apparatus as claimed in claim 41 wherein said parabolic portions comprise a single trough structure having a flat region between said first and second inner edges.

43. Apparatus as claimed in claim 41 wherein said first element extends diagonally with respect to said rotation axis from adjacent to said first edge to said first line and said second element extends diagonally with respect to said rotation axis from adjacent to said rotation axis from adjacent to said second edge to said second line.

44. Apparatus as claimed in claim 43 wherein said elements are located side by side.

45. Apparatus as claimed in claim 42 wherein the first and second parabolic portions have first and second upper edges respectively which are located at a level which is between said rotation axis and said lower edges whereby upper portions of one or other of said first and second elements is exposed to direct solar radiation when said concentrating means is grossly misaligned with the sun.

46. Apparatus as claimed in claim 39 wherein said first and second parabolic portions are formed in a single trough and wherein there is a flat between said first and second parabolic portions.

47. Apparatus as claimed in claim 38, 39 or 46 wherein said focal lines are located on the outer surfaces of photovoltaic elements when the concentrating means is correctly aligned with the sun.

48. Apparatus as claimed in claim 47 wherein said photovoltaic elements are arranged in first and second parallel rows each element within said first and second row having its outer face transverse to the mean direction of radiation received from the first and second parabolic portion respectively.

49. Apparatus as claimed in claim 48 wherein said rows of photovoltaic elements are moved in unison with the concentrating means.

50. Apparatus as claimed in claim 49 including a heat transfer conduit in thermal contact with said photovoltaic elements.

51. Apparatus as claimed in claim 50 wherein the heat transfer conduit moves with said photovoltaic elements.

52. Apparatus as claimed in claim 38 wherein said portions of said first and second elements are located adjacent to said first and second lines respectively.

53. Apparatus as claimed in claim 38 wherein said surface comprises the outer surface of a heat transfer conduit.

54. Apparatus for tracking the sun, said apparatus comprising focusing means for concentrating solar energy into first and second spaced lines which are located on or near a solar energy utilization surface when said focusing means is correctly aligned with the sun, first and second solar energy sensitive elements operable on impingement of solar energy thereon to produce control signals for controlling tracking movements of the focusing means, said first and second elements being located relative to said surface such that when the focusing means is misaligned with the sun either (a) the first line impinges upon the first element or (b) the second line impinges upon the second element.

55. Apparatus as claimed in claim 54 including shading means to shade said first and second elements from direct solar radiation when the focusing means is correctly aligned with the sun.

56. Apparatus as claimed in claim 54 or 55 wherein portions of said first and second elements are located adjacent to said first and second lines respectively.

57. Apparatus as claimed in claim 56 wherein said first and second elements extend from adjacent the focusing means to adjacent the first and second lines respectively.

58. Apparatus as claimed in claim 55 including heat transfer means located relative to the focusing means such that said first and second lines impinge thereon when the focusing means is correctly aligned with the sun.

59. Apparatus as claimed in claim 58 wherein said heat transfer means comprises a single conduit.

60. Solar energy conversion apparatus comprising a solar energy utilization surface, reflective concentrating means, and tracking means, said tracking means being operable to cause the concentrating means to track the sun and thereby concentrate solar energy on said surface characterized in that the apparatus includes means defining a shaded zone between said concentrating means and said surface such that solar rays reflected from the concentrating means towards said surface do not enter said zone when the concentrating means is aligned with the sun and wherein said tracking means includes solar energy sensitive elements located within said zone, said elements producing tracking control signals when struck by solar rays when the concentrating means is not aligned with the sun.

61. Apparatus as claimed in claim 60 wherein said concentrating means comprises a reflective trough and wherein said means defining a shaded zone extends longitudinally of said trough and spaced therefrom.

62. Apparatus as claimed in claim 60 or 61 wherein said solar energy sensitive elements comprise first and second elongate elements which are parallel to one another.

63. Apparatus as claimed in claim 62 wherein said trough has first and second parabolic portions which concentrate solar energy on said surface in first and second lines.

64. Apparatus as claimed in claim 63 including mounting means for mounting said trough for rotation about a rotation axis which is parallel to, between and equidistant from said first and second lines.

65. Apparatus as claimed in claim 64 wherein said elements comprise metallic members which are generally parallel to the said first and second lines when the trough is viewed in plan but extend diagonally relative to said lines when viewed in side elevation.

66. Apparatus as claimed in claim 65 wherein the tracking means includes drive means responsive to said tracking control signals, said drive means including a body which is mounted for rotation relative to the trough about a second axis which intersects and is perpendicular to said first and second lines, one end of each of said members being coupled to said body at points on opposite sides of said second axis whereby expansion of one or other of the members causes rotation of the body about said second axis.

67. Apparatus as claimed in claim 66 wherein said parabolic portions are formed as a single trough which is carried by a trough support structure mounted for rotation about said rotation axis in a framework, said support structure including a counter-weight bar, the bar constituting said means defining a shaded zone.

68. Apparatus as claimed in claim 64 wherein said energy utilization surface moves in unison with said trough and includes first and second faces which are transverse to the mean direction of solar energy reflected from said first and second parabolic portions respectively.

69. Apparatus as claimed in claim 68 wherein said faces comprise energy responsive faces of photovoltaic cells.

70. Apparatus as claimed in claim 69 wherein said cells are mounted on a heat transfer conduit.

* * * * *